United States Patent
Monney et al.

(10) Patent No.: US 9,959,644 B2
(45) Date of Patent: May 1, 2018

(54) COMPUTERIZED METHOD AND DEVICE FOR ANNOTATING AT LEAST ONE FEATURE OF AN IMAGE OF A VIEW

(75) Inventors: Mathieu Monney, Lausanne (CH); Serge Ayer, Farvagny (CH); Martin Vetterli, Grandvaux (CH)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 13/995,578

(22) PCT Filed: Nov. 17, 2011

(86) PCT No.: PCT/EP2011/070382
§ 371 (c)(1),
(2), (4) Date: Jul. 30, 2013

(87) PCT Pub. No.: WO2012/084362
PCT Pub. Date: Jun. 28, 2012

(65) Prior Publication Data
US 2013/0311868 A1   Nov. 21, 2013

(30) Foreign Application Priority Data
Dec. 21, 2010   (CH) ...................... 2131/10

(51) Int. Cl.
*G06F 17/00* (2006.01)
*G06T 11/60* (2006.01)
(Continued)

(52) U.S. Cl.
CPC ............ *G06T 11/60* (2013.01); *G06F 17/218* (2013.01); *G06F 17/24* (2013.01); *G06F 17/241* (2013.01);
(Continued)

(58) Field of Classification Search
CPC ............ G06F 17/241; G06F 17/30781; G06F 17/30256; G06F 17/30017; G06F 17/24; G06F 17/218
(Continued)

(56) References Cited

U.S. PATENT DOCUMENTS 6,915,011 B2 *  7/2005  Loui ................... G06F 17/3025
                                                    382/173
8,890,896 B1 *  11/2014  Tseng .................... G06T 7/0018
                                                    340/435

(Continued)

FOREIGN PATENT DOCUMENTS

EP   1246080 A2   10/2002
EP   2154481 A1   2/2010
(Continued)

OTHER PUBLICATIONS

Pinaki Sinha and Ramesh Jain, "Classification and Annotation of Digital Photos Using Optical Context Data", Jul. 7-9, 2008, Niagara Falls, Ontario, Canada, ACM, pp. 9.*
(Continued)

*Primary Examiner* — Chau T Nguyen

(57) ABSTRACT

A computerized method for annotating at least one feature of an image of a view, includes the steps of obtaining the image with an image sensor of a portable device, and retrieving at least one condition. Based on the at least one condition, the method automatically selects a feature identification method among a plurality of features identification methods. It then applies the feature identification method for identifying the at least one feature, and annotates some of the identified features.

10 Claims, 7 Drawing Sheets

(51) Int. Cl.
*G06F 17/24* (2006.01)
*G06F 17/21* (2006.01)
*G06F 17/30* (2006.01)

(52) U.S. Cl.
CPC .. *G06F 17/30017* (2013.01); *G06F 17/30256* (2013.01); *G06F 17/30781* (2013.01)

(58) Field of Classification Search
USPC .......................................................... 715/230
See application file for complete search history.

(56) References Cited

U.S. PATENT DOCUMENTS

| | | | |
|---|---|---|---|
| 2002/0044691 A1* | 4/2002 | Matsugu | 382/218 |
| 2002/0075282 A1* | 6/2002 | Vetterli et al. | 345/632 |
| 2002/0089519 A1 | 7/2002 | Betz et al. | |
| 2004/0021780 A1* | 2/2004 | Kogan | H04N 1/32128 348/231.3 |
| 2004/0030741 A1 | 2/2004 | Wolton et al. | |
| 2004/0190775 A1* | 9/2004 | Miller | 382/190 |
| 2005/0141762 A1* | 6/2005 | Zhao et al. | 382/164 |
| 2008/0002864 A1* | 1/2008 | Das | G06K 9/00664 382/118 |
| 2009/0087160 A1* | 4/2009 | Lui et al. | 386/66 |
| 2009/0110241 A1* | 4/2009 | Takemoto et al. | 382/103 |
| 2009/0161962 A1* | 6/2009 | Gallagher | G06F 17/30247 382/203 |

FOREIGN PATENT DOCUMENTS

| | | |
|---|---|---|
| EP | 2207113 A1 | 7/2010 |
| JP | H10267671 A | 10/1998 |
| JP | 2001216309 A | 8/2001 |
| JP | 2005292064 A | 10/2005 |
| JP | 2006059136 A | 3/2006 |
| JP | 2007018456 A | 1/2007 |
| JP | 2009017540 A | 1/2009 |
| JP | 2010009192 A | 1/2010 |

OTHER PUBLICATIONS

Choi et al., "Feature Selection in source Camera Identification", Oct. 8-11, 2006, Taipei, Taiwan, IEEE Conference on Systems, Man, and Cybernetics, pp. 5.*
Yong Jae Lee and Kristen Grauman, "Foreground Focus: Finding Meaningful Features in Unlabeled Images", Sep. 2008, To appear, Proceedings of the British Machine Vision Conference (BMVC), pp. 10.*
Yong Jae Lee and Kristen Grauman, "Foreground Focus: Finding Meaningful Features in Unlabeled Images", To appear, Proceedings of the British Machine Vision Conference (BMVC), Sep. 2008, pp. 10 (Year: 2008).*
W-C. Lin et al. "Improving Image Annotation via Useful Representative Feature Selection," Cognitive Processing, vol. 10, No. 3, Dec. 13, 2009, pp. 233-242.
X. Liu et al., "SEVA: Sensor-Enhanced Video Annotation," ACM Transactions on Multimedia Computing, Communications and Applications, vol. 5, No. 2, Article 34, Aug. 1, 2009, pp. 1-26.
S. Bloehdorn et al., "Semantic Annotation of Images and Videos for Multimedia Analysis," The Semantic Web: Research and Applications, May 19, 2005, pp. 592-607.
W. Li et al. "Automatic Image Annotation Based on WorldNet and Hierarchical Ensembles," Computational Linguistics and Intelligent Text Processing Lecture Notes in Computer Science, vol. 3878, Jan. 1, 2006, pp. 417-428.
Y. Jin et al., "Improving Image Annotations Using WordNet," Advances in Multimedia Information Systems Lecture Notes in Computer Science, vol. 3665, Jan. 1, 2005, pp. 115-130.
Calonder, et al., "BRIEF: 5 Computing a Local Binary Descriptor Very Fast", European Conference on Computer Vision, Heraklion, Greece, 2010.
Nister et al., "Scalable Recognition with a Vocabulary Tree", CVPR, 2006.

* cited by examiner

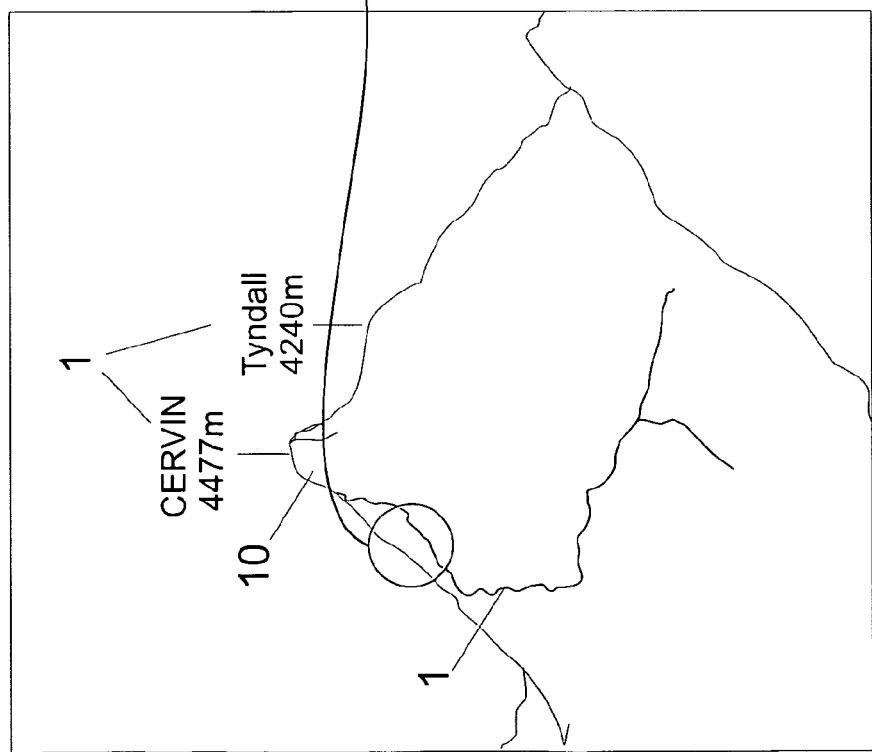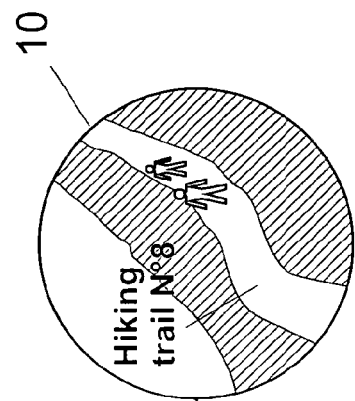

COMPUTERIZED METHOD AND DEVICE FOR ANNOTATING AT LEAST ONE FEATURE OF AN IMAGE OF A VIEW

This application is a National Phase of PCT/EP2011/070382, filed on Nov. 17, 2011, which claims the priority of Swiss Patent Application CH2010/2131, filed on Dec. 21, 2010, the contents of both of which are hereby incorporated by reference.

FIELD OF THE INVENTION

The present invention concerns a computerized method and device for annotating at least one feature of an image of a view.

DESCRIPTION OF RELATED ART

The concept called "mediated reality" indicates the possibility to modify by a device a view of the reality, e.g. augmenting or reducing it. The expressions "augmented reality" and "reduced reality" respectively indicate a live view of a physical real-world environment whose elements or features are augmented by virtual inputs—such as graphic elements or text annotations superimposed on the captured image- or respectively reduced or suppressed. For example, it is possible to annotate prominent features of an image of a view with identifying or characterising information.

The annotation of features of an image should not be confused with annotation of whole image for classification or retrieval purpose, as described for example in "Improving image annotations using wordnet", Advances in multimedia information systems lecture notes in computer science, Springer, Berlin-Heidelberg (ISBN 978-3-540-28792-6), Pages 115-130, 01 janvier 2005, by Yohan Jin et al. (University of Texas). Annotation of features of the image results in a modified image or video, for example an image of video with additional annotations superimposed or otherwise delivered to the viewer during normal use of the image. Annotation of image for classification usually results in additional metadata, such as additional keywords, associated with the image and which are usually hidden during normal use of the image.

Methods and devices for annotating features of an image of a view are known.

EP1246080 describes a computerised method and device for annotating a feature which emits a radio signal. The feature can be identified my means of this radio signal. The identified feature is then related to annotating data associated with the feature, which is then displayed on the device. The feature can be an element belonging to a museum, e.g. it can be a painting or a statue, having a circuit for emitting a radio signal. EP1246080 also describes the use of cartographic data or other spatial information in digital form: a correspondence matching between cartographic and pictorial data can allow the pictorial data to be annotated with cartographic data.

However, in the case wherein the feature or element to annotate belongs to a landscape, for example it is a mountain in a view of a mountain range, EP1246080 does not suggest how to handle the annotation method with the same device used in a museum. Obviously mountains and landscape elements do not have circuits for emitting radio signals. On the other hand a device which uses cartographic data for annotating a feature can hardly be used in a museum wherein elements can emit radio signals. In other words EP1246080 does not suggest how to handle with the same device the annotation of a feature of an image of a view belonging to different environments and locations.

EP2207113 describes a computerised method and device for annotating a feature of a view based on the position and the orientation of the device.

Both EP1246080 and EP2207113 briefly describe that, in the case of a stereographic image, i.e. an image represented by a pair of views from two specific points, a 3D view can be used for addressing ambiguities which a 2D view cannot resolve. Such a 3D model is mainly useful for features in close vicinity, such as a sculpture in a museum or a park, but less useful and time-consuming for identifying remote features.

EP2154481 describes an image capturing device which can automatically switch from a real 2D display mode to a virtual 3D display mode depending on the position and the orientation of the device and on its zooming factor. The device then automatically chooses the type of the image representation, real or virtual.

JP2005292064 describes a navigation system for outputting a three-dimensional or two-dimensional display data if three-dimensional data are unavailable or they are not easy to be displayed. US2004030741 describes another navigation system which allows a manual selection of a 2D or 3D image display. These documents then are not related to modified reality devices.

There is then a need of a computerized method and device for annotating at least one feature of an image of a view allowing to efficiently handle the annotation of a feature belonging to different environments and locations.

In case of annotation of a live video stream, the latency created by the communication network to retrieve the annotation content from a remote server for each frame (or each different type of scene or objects) is sometime too high. On the other hand it is also impossible to store all the annotations on the portable device, due to memory and processing speed constraints. The current annotation of a live video stream is thus not efficient or not possible.

Therefore, there is a need to instantly annotate a real-time video stream produced by an image sensor of a device.

There is also a need to reduce the communication cost and increase the transfer speed between a remote server and a portable device.

It is then an aim of the present invention to obviate or mitigate one or more of the aforementioned disadvantages.

BRIEF SUMMARY OF THE INVENTION

According to the present invention, this aim is achieved by means of a computerized method for annotating at least one feature of an image of a view according to claim 1, by means of a computer-readable storage medium according to claim 16 and by means of a system for annotating at least one feature of an image of a view according to claim 17.

The noun "feature" in this context indicates any element or characteristic of an image of a view. A feature can be, for example and without any limitation, a mountain, a painting, a statue, a person, the weather, an article in a newspaper, a poster, a restaurant, any other elements on a street, etc. The feature could be static, i.e. having a fixed position in time, or dynamic, i.e. having a position or its appearance changing over time. In this last case this kind of feature will be not only be identified but also tracked. In one embodiment, where the appearance of the feature can change dynamically over time, e.g. an advertisement clip displayed on a digital signage display, the identification and tracking of the feature can use either the temporal inter-frame relation in the case of a video stream, or use a static portion of the image, which remains static during a window of time.

The noun "annotation" indicates one or more words, symbols, smileys, drawings, lines, arrows, images, etc. which identify or characterise a particular feature in an image. The annotation is visible during normal observation of the image; for example, the annotation is superimposed on the annotated image.

If a feature is not recognised, its annotation could be a question mark.

The noun "annotation" can also indicate an audio message, comprising sounds and/or verbal expressions. The noun "annotation" can further indicate a sequence of audio images or video clip, i.e. both visual and audio messages. In one embodiment, the annotations can also be interactive, e.g. the user can click on an annotation to trigger an action. The result of such an action could be a menu asking for user input or displaying different information to the user. In another embodiment, a menu is presented to the user as soon as the corresponding feature is recognized, without the need for the user's interaction.

In another embodiment it is necessary that the user executes an action before the displaying of the annotation. For example, the feature to annotate is a placard containing a square composed by 16 points, asking the user to trace few straight lines for connecting all the 16 points. If the user properly traces these lines, the feature will be annotated, e.g. with an audio annotation comprising an applause.

The expression "portable device" may indicate, but it is not limited to, a camera, a video-camera, a mobile phone, a laptop, a computer a personal digital assistant (PDA), a smart-phone, a game console. In the case of a video-camera, the image obtained by this video-camera comprises at least one frame of a video stream, which could be a real-time video stream.

The noun "condition" in this context designates relations between parameters, which can be used for selecting one feature identification method among a plurality of avaliable methods. The condition might depend on the image obtained from the image sensor of the portable device or on other sources, like
one or more localisation sensors
one or more network-based sensors
one or more portable device parameters
one or more remote servers.

As an example of a condition retrieved from the image, the a priori recognition of some features of the image could be used for selecting an annotation method. For example, the method could categorize features identified in the image, such as the presence in the image of a mountain view, such as the Matterhorn (Cervin), of a building such as the Leaning Tower of Pisa, of a sculpture such as the Discobolus, or of a painting such as the Mona Lisa. Example of categories of identified features include for example landscape elements, urban elements, traffic elements, close-up elements, etc.

If the condition depends on the location of the portable device, as detected for example from a localisation sensor like a GPS and/or a network-based localisation sensor, the selected identifying method can depend for example on the category of the location for selecting an appropriate annotation method. Examples of categories include landscape vs. urban view; indoor location vs. outdoor location; highway vs. museum; etc.

Indoor and outdoor categorization can also depend on the measured brightness, or on use of an additional flash light.

Other conditions can be retrieved from parameters of the portable device. In one example, parameters of the lens can be used, such as the zooming factor, the aperture or the focusing distance. A user-selected or automatically selected scene mode, in order to distinguish between Auto, Portrait, Party/Indoor, Beach/Snow, Landscape, Close-up, Museum, Dusk/Dawn etc. for example, can also be used as a condition for determining the most adapted feature identification method.

These device parameters can be automatic or manually selected by the user. For example, the use of the flash can be automatically set by the portable device—e.g. in the scene mode "Auto" if the light is considered not sufficient or in the scene mode "Party/Indoor" —or it can be manually set by the user by selecting an hapting means of the portable device or by adding an external flash device to the portable device.

The condition can also be retrieved from a database of one or more remote servers comprising image models.

The expression "feature identification method" in this context designates a method which is selected for identifying one or several features in a captured image. The selection of the method depends on at least one of the mentioned conditions, so that different feature identification methods are used in different conditions. An example of feature identification method includes, a matching of features in a captured image with reference 2D images stored in a local or remote database of known features. Another feature identification method which can be used under different condition included a matching of features in a captured image with projections of one or several 3D models stored in a local or remote database. Yet another feature identification method includes use of a radio signal emitted by a radio beacon, such as a RFID element, associated with the captured element and received by the user's device.

Once a particular feature identification method has been selected, the choice of a particular database of reference 2D respectively 3D elements used by the selected method can also depend on the conditions.

In one example, if the focusing distance is compatible with an object in the foreground, such as e.g. the Discobolus, the selected feature identification method may be a 3D matching recognition or identification method, in which the capture image of the Discobolus is matched with projections of candidate 3D reference elements in a database. If the focusing distance is compatible with an object in the background, such as for example a mountain range, the selected feature identification method may be a 2D matching recognition or identification method, in which the profile of the mountain range is matched with 2D reference images in a database.

Advantageously, the method according to the present invention automatically selects a 2D or a 3D feature identification method depending on the current focusing distance of the portable device.

Advantageously, the method can use and combine more than one condition in order to determine the best feature identification method. In the previous example, if the image contains the Discobolus, it is likely that the portable device is set on a "Museum" mode. This different condition, in this example, confirms that a 3D matching algorithm is suitable, so that a specific database containing 3D images, e.g. images representing statues of the ancient Greece, can then be selected based on these conditions and the Discobolus can quickly and efficiently be identified.

In the other previous example of an image containing a mountain range, it is likely that the portable device is set on the "Landscape" mode, so that it does not use a flash and that it can retrieve the geographical position of the device by using a location sensor, e.g. a GPS sensor, linked to its image sensor, or a network-based sensor, e.g. for localising the device in a GSM or UMTS network. When those conditions are met, a feature identification method is selected in which a specific database containing 2D images, e.g. images representing landscape profiles of this particular location, is selected based on these conditions and the mountain range can quickly and efficiently be identified.

According to an independent aspect of the invention, it is possible to automatically select a set of "annotations candidates", i.e. a set of annotations among a plurality of annotations. This selection of candidates is based on at least one condition, similar to the automatic selection of a feature identification method. In one preferred embodiment, this at least one condition depends on the device location retrieved from a location sensor, e.g. a GPS sensor, of the portable device.

The annotations candidates could be downloaded wirelessly through a cellular network, e.g. UMTS, or Wifi, from a remote server on the portable device: in this manner, the annotation of an image of a view can be done on the portable device itself, without the need of any external server. The annotation device can also be shipped with a large non-volatile set of annotations, stored on a medium like a flash memory, a DVD etc. In that case, the annotation device will only use a subset of this set of. In fact some annotation set can be embedded into an annotation device like a compact digital camera, wherein the camera can recognize the view the user is currently looking at and automatically "tag" the image of the view he's taking, with the recognized annotation. A feature identification method, which in one embodiment can depend on at least one condition as discussed above, is then applied for identifying at least one feature of the image of the view. In one embodiment, the method explained in "BRIEF: Computing a Local Binary Descriptor Very Fast", M. Calonder & al, European Conference on Computer Vision, Heraklion, Greece, 2010 combined with the method explained in "Scalable Recognition with a Vocabulary Tree", D. Nistér & al, CVPR, 2006 is used for this purpose, although other methods could be used. After deciding which of the identified features are annotated, the correspondence between these identified features and the annotations candidates is verified.

If a correspondence or match is found, it is decided how and where to write and/or reproduce the annotations for the identified features, how many annotations are superimposed on the image, the fonts' types and dimensions of the written-annotations, the volume and/or the language of the video-annotations, etc. Some of the identified features are then annotated.

If a correspondence or match is not found, another set of candidates is downloaded from the same or from another server and the correspondence between the identified features and the new candidates is verified. The new set is in general wider than the previous, i.e. it contains candidates which have a lower number of common features. If a correspondence or match is found, the above considerations are still valid, if not the downloading and verifying steps are carried on in an iterative manner until when a correspondence or matching is found. If not, an annotation failure message is communicated to the user of the portable device, e.g. by a written message displayed on the portable device. In one embodiment the user is asked to help the device to find the desired annotations, e.g. by introducing some searching criteria on the portable device.

According to an independent aspect of the invention, the inventive method for annotating at least one feature of an image of a view comprises the following steps obtaining said image with an image sensor of a portable device, retrieving at least one condition, based on said at least one condition, automatically selecting a set of feature identification data and/or a set of annotations candidates among a plurality of feature identification data and/or annotations on a remote server, downloading said set or sets on said portable device, verifying if features of said image match feature identification data, if a correspondence is found, annotating at least some of the identified features, if a correspondence is not found, changing and/or widening the set of feature identification data and/or annotations candidates until a correspondence is found, and/or informing the user of the portable device and asking him to insert some feature identification data and/or annotations candidates.

If a correspondence is not found, the user himself could add a new feature identification data, which is not known by the annotation device nor by a remote server. The new feature identification data is for example a model or template of a feature available on the image and that the user wants to annotate, and which can be used for recognizing this feature on other similar images. The new feature identification data could correspond for example to a portion of the captured image which the user wants to annotate with a new annotation. The new annotation is sent to the remote server by using the same communication link which was used for downloading the annotation set. Future users would then be able to have the objects of the image of a view annotated. The annotations could thus be user-generated and shared among users.

Examples of conditions which can be considered according to this independent aspect can depend on:

The geographical position of the camera retrieved from a location sensor, e.g. a GPS sensor linked to the camera image sensor, or from a cellular network such as a GSM or UMTS network.

User settings.

A datagram and/or bar-code and/or RFID and/or any other recognizable features, e.g. a logo, an OCR detection, on the feature(s) to annotate.

The current data and/or time.

The quality of the communication link between a server and the portable device.

The portable device computation power.

Etc.

According to the above independent aspect, it is possible to instantly annotate a real-time video stream produced by an image sensor of a device.

In order to execute the annotation of a live video stream in real-time, the feature identification method has to be carried out within the portable device. Usually this feature identification method involves the use of some feature identification data, depending on the chosen method, in order to reach the identification goal. For example, by using a computer vision method, the feature identification method needs a "model" of each feature it has to identify. The portable device uses that model to identify the features in the image of a view and annotate them. By doing so, the portable device is not only a display-capable device but also an annotation device where all the required image and sensor processing is done on the portable device itself without the need of any external server.

In one embodiment the feature identification data are optimised by the remote server for reducing the communication costs between the remote server and the annotation device and/or for reducing the computation need of the annotation device.

According to a further independent aspect of the invention, the selection of feature identification data which are downloaded from a remote server to the portable device depends on the discussed at least one condition. According to another independent aspect of the invention this selection depends on the quality of the communication link between the server and the portable device. According to another independent aspect of the invention this selection depends on the portable device computation power and/or available memory space.

BRIEF DESCRIPTION OF THE DRAWINGS

The invention will be better understood with the aid of the description of an embodiment given by way of example and illustrated by the figures, in which:

FIG. 2 shows an example of an image obtained by a portable device comprising an image sensor.

FIG. 3 shows another image, obtained by zooming the image of FIG. 2.

DETAILED DESCRIPTION OF POSSIBLE EMBODIMENTS OF THE INVENTION

Figure 1:
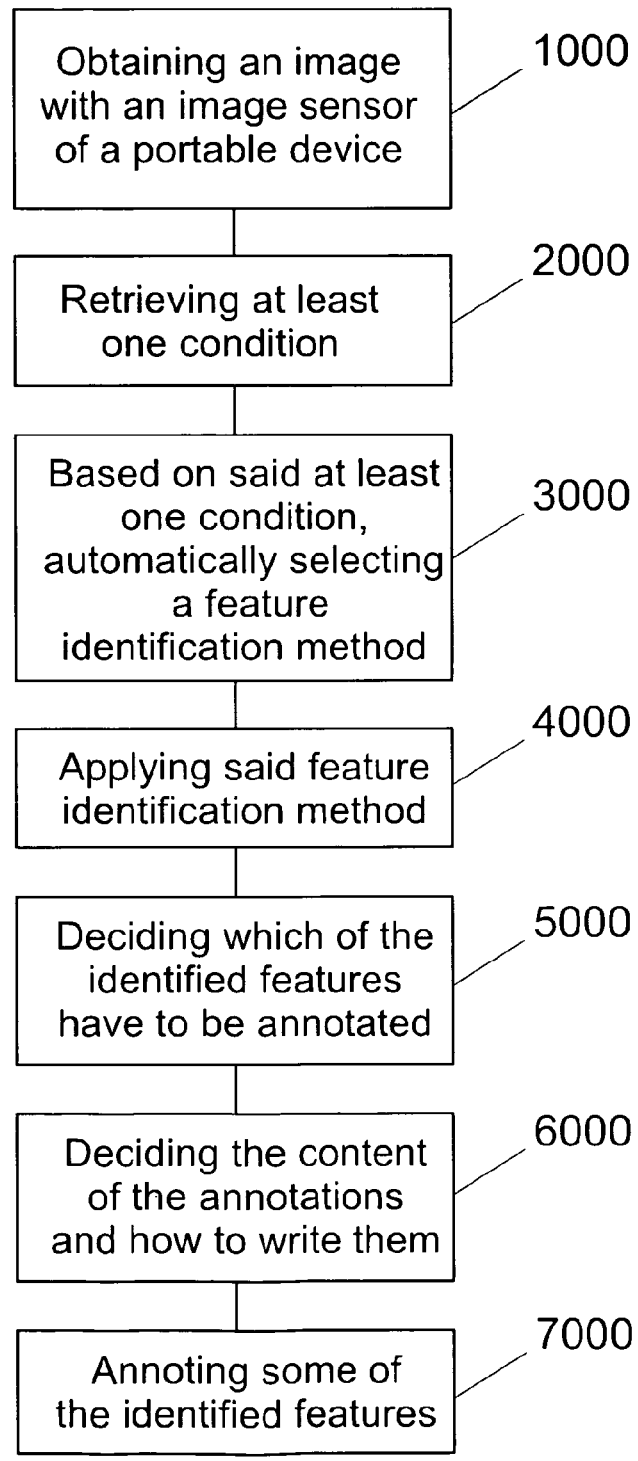
FIG. 1 shows a flowchart of steps involved in one embodiment of the method according to the invention.

The method according to the invention may comprise the following steps, illustrated in FIG. 1:

(a) Obtaining an Image with an Image Sensor of a Portable Device (1000).

For example the portable device can be a digital camera and the image obtained may be of the Discobolus.

(b) Retrieving at Least One Condition (2000).

In one example the condition can depend on the focusing distance of the camera, and/or on the scene mode selected by the user or automatically in the portable device, and/or on a radio signals by the statue. In another example, the camera has or is linked to a localisation sensor or to a network-based sensor and a condition could depend on the localisation of the view of the image.

(c) Based on the at Least One Condition, Automatically Selecting a Feature Identification Method Among a Plurality of Feature Identification Methods (3000).

An example of selected method could be a 2D matching identification method, i.e. using computer vision methods for matching a 2D template as feature identification data with features of the image. Another method could be a 3B matching method, i.e., matching the image with features of a 3D model.

(d) Applying Said Feature Identification Method for Identifying at Least One Feature (4000).

In this example the image contains only one prominent feature, i.e. the Discobolus, which is then identified.

(e) Deciding which of the Identified Features have to be Annotated (5000).

In this example there is only one feature to annotate. This step may depend on the previous retrieved conditions. The feature to annotate could be a Point of Interest (POI), e.g. retrieved from a GPS sensor, the most interesting feature for the user, which can be manually introduced, the highly visible feature, the most important—not necessarily corresponding to the most visible—features, etc. The number of features to annotate takes into account the space on the display of the portable device.

(f) Deciding the Content of the Annotations and how to Write the Annotations for the Identified Features (6000).

For example in this case the content of the annotation is a description of the Discobolus (author, date, artistic informations). Even if the geographical location of the Museum of the Discobolus is available, in this example it is not useful to displaying it. At this step it is possible to select the size, the colour, the font, the transparency, etc. of the annotation. This selection may depend on the previous retrieved conditions, e.g. since the Discobolus is in a museum, an artistic and handwritten-like font could be automatically selected. The collisions between annotations are avoided. The size of the annotation takes into account the number of features to annotate, the space on the display of the portable device and the user reading constraints.

(g) Annotating the Identified Features (7000).

The annotations are then displayed on the portable device.

Advantageously then the method according to the invention allows to efficiently handle the annotation of a feature belonging to different environments and locations.

In one preferred embodiment, the automatically chosen feature identification method may be validated by the user of the portable device. If he does not validate the method, he can manually select another method. The feedback of the user can then be taken into account by the portable device for further automatic choices of the feature identification method. This user feedback procedure can be repeated iteratively.

The invention concerns also a system for annotating at least one feature of an image of a view, comprising:

(a) a portable device comprising an image sensor for obtaining said image
(b) means for retrieving at least one condition
(c) means for automatically selecting a feature identification method based on said condition among a plurality of feature identification method
(d) means for applying said feature identification method for identifying said at least one feature
(g) means for annotating some identified features.

The system may comprise (e) means for deciding what identified features have to be annotated
(f) means for deciding the content of the annotations and how to write the annotations for the identified features.

In one embodiment the portable device comprises said means for retrieving and/or said means for selecting and/or said means for applying and/or said means for annotating.

In another embodiment the system comprises one or more remote servers comprising said means for retrieving and/or said means for selecting and/or said means for applying and/or said means for annotating.

FIG. 2 shows an example of an image obtained by a portable device comprising an image sensor, e.g. a digital camera (step 1000 of FIG. 1). The image shows a mountain, here the Matterhorn (Cervin). The prominent feature is the Matterhorn (Cervin) 10, but the image comprises other features, e.g. other mountains in the range.

According to the method of the invention, at least one condition is retrieved and associated with this image (step 2000 of FIG. 1). Example of conditions which can be considered can depend on:

The focusing distance of the camera.

The scene mode of the camera if available, e.g. "Landscape".

The use or not of the camera flash.

The environment (mountain/outdoor).

The geographical position of the camera, e.g. Zermatt—Switzerland, retrieved from a location sensor, e.g. a GPS sensor linked to the camera image sensor, or from a cellular network such as a GSM or UMTS network. The geographical position retrieved from a cellular network can be performed by trilateration and/or by triangulation.

An a priori categorization of the image, based on image analysis and, possibly, image matching with a remote server comprising models.

Information provided by one or more sensors located in or associated with the annotation device, e.g. a thermometer or a microphone. For example the noise of the surround captured by a microphone connected to the annotation device can give information on the indoor/outdoor environment and then generate a condition.

Etc.

A categorization of the image could be performed, based on one or more of the previous conditions. For example, a particular focusing distance (for example 3.8 m) could be associated with a category of focusing distance (for example close range). A particular location (for example Zermatt) could be associated with a corresponding category of locations (for example countryside or landscape). A particular image (the Matterhorn) can be associated with a category of images (landscape), etc.

Depending on one or several of the above mentioned conditions, for example based on those categories, a feature identification method is then automatically selected (step 3000 of FIG. 1) among several methods which are available, and then applied for identifying at least one feature 10 of the image (step 4000 of FIG. 1). In this example the Cervin, the Tyndall and other lower peaks are recognised.

According to one embodiment of the inventive method, it is possible to select which of the identified features of the image (Cervin, the Tyndall and other lower peaks) have to be annotated (step 5000 of FIG. 1). In the illustrated example, only the Cervin and the Tyndall are selected, while other image features, although identifiable, are not selected for annotation. This step can be based at least partially on the previously retrieved conditions. For example, the system can decide to annotate only geographic feature element (such as mountain) when a landscape view has been detected, but not the persons or other elements which may be present on the image.

According to one aspect of the invention, it is possible to decide the content of the annotations 1 and how to write them (step 6000 of FIG. 1). Usually, once the features have been selected, this step is not dependent on the previously retrieved conditions. However it is possible to imagine a search in a specific database containing the name of the mountains and their altitude in the case of a mountain range as in the example, or in another database in the case of a museum.

In this example each annotation 1 comprises the name and the altitude of each selected mountain. However, since the Cervin is the most important feature, its name will be written with a different font, or a different colour, or a frame around, or with capital characters as in FIG. 2.

In one embodiment the user could manually select a feature to annotate.

At step 6000 the font and the dimension of the annotations 1 are adapted in order to avoid collision and taking into account the space available on the display of the camera and the user reading constraints.

Another possible feature could be a hiking trail: in this example the annotation could be a line superposed on the image and indicating this hiking trail. If the user of the portable device zooms the image, he can visualize another image as illustrated in FIG. 3. The change of the zooming factor could automatically change the feature identification method used, which could be based now on a 3D feature identification method, instead of the previous 2D feature identification method. The hiking trail can then be recognised with this different method, and annotated.

Figure 4:
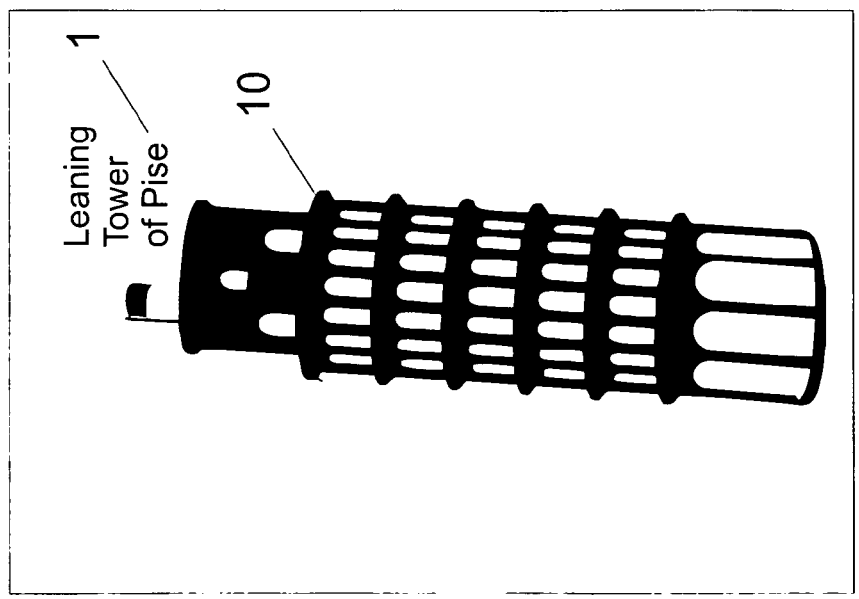
FIGS. 4 to 7 show other examples of images obtained by a portable device comprising an image sensor.

FIG. 4 shows another example of an image obtained by the same digital camera used for FIGS. 2 to 3. In this case possible conditions could be:

The focusing distance of the camera.

The scene mode of the camera if available, e.g. "Auto".

The use or not of the camera flash.

The environment (outdoor) and/or the geographical position of the location, e.g. Pisa—Italy, retrieved from a location sensor, e.g. a GPS sensor linked to the camera image sensor, or a network-based sensor linked to the camera image sensor, the network being for example a GSM or UMTS network.

The results from image matching with a remote server comprising models.

Etc.

In such example the selected feature identification method could be based now on a 3D feature identification method, i.e. a method where features of the captured image are matched with projections of 3D models stored in a database.

Figure 5:
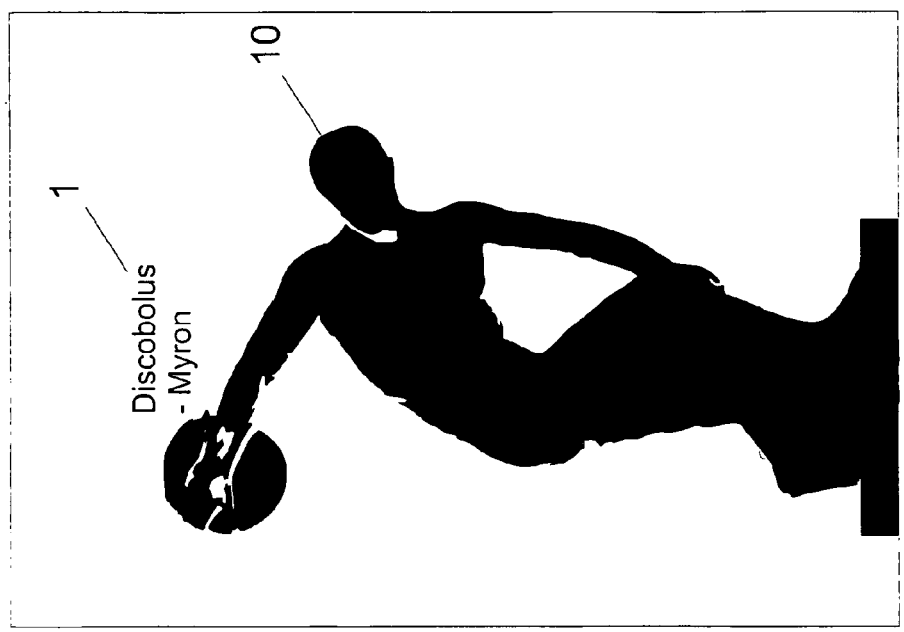

Similar considerations are valid for the image of FIG. 5, obtained indoor instead of outdoor. In this case the feature identification method could use a RFID signal emitted from a sender close to the Discobolus.

Figure 6:
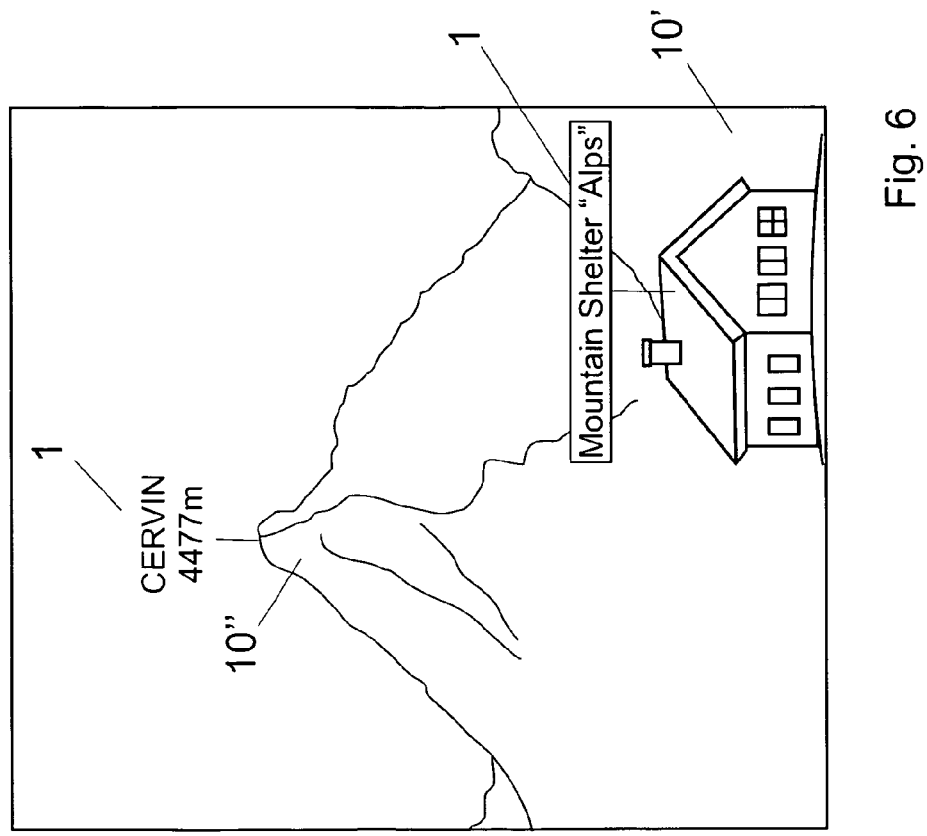

In the case of FIG. 6 the image contains two possible prominent features: the Cervin 10" in the background and the mountain shelter 10' in the foreground. In this case the selection of a feature identification can depend on the focusing distance of the portable device. If for example the focus is on the mountain shelter, a 3D feature identification method will be automatically used and the annotation will be for example surrounded by a frame, as illustrated in FIG. 6.

It is possible to imagine that, even if the focus is on the mountain shelter, the user could be interested to know the name and the altitude of the highest peak in the background. He can then manually invalidate the used 3D feature identification method by using haptic means of the portable device and causing the use of a 2D feature identification method for annotating the Cervin.

Figure 7:
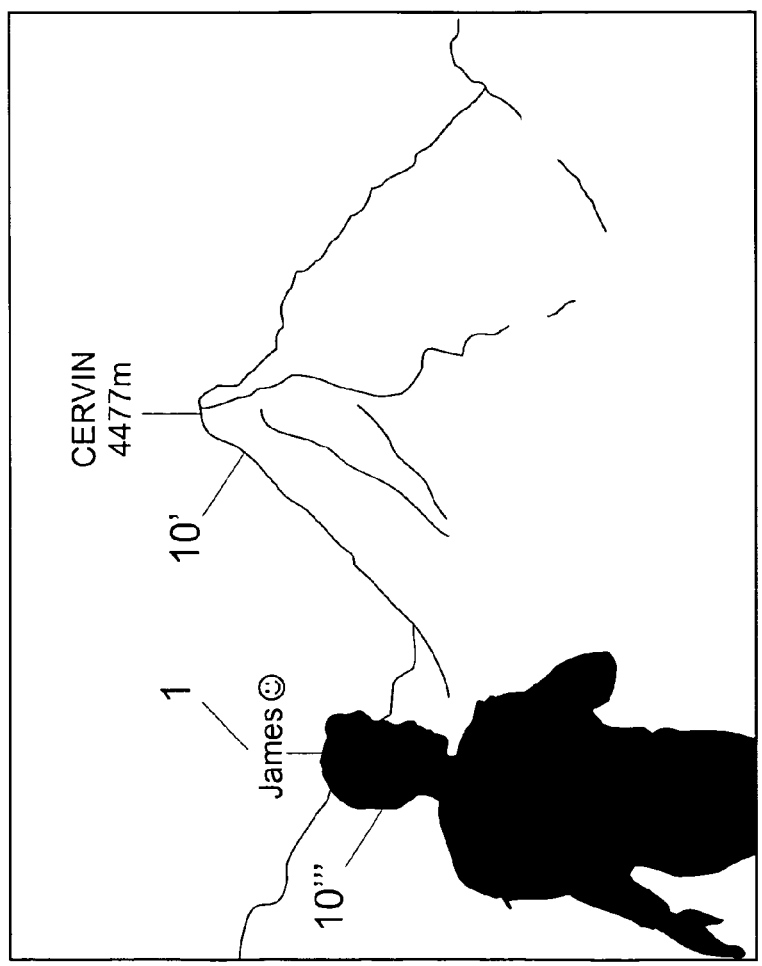

In the case of FIG. 7 the image contains other two possible prominent features: the Cervin 10" in the background and a person 10''' in the foreground. The same considerations for the FIG. 6 are valid also for the FIG. 7. In this case the annotation of the person could comprise a symbol like a smile retrieved from a remote server and associated with the person 10''' which has been identified with a 3D feature identification method.

Figure 8:
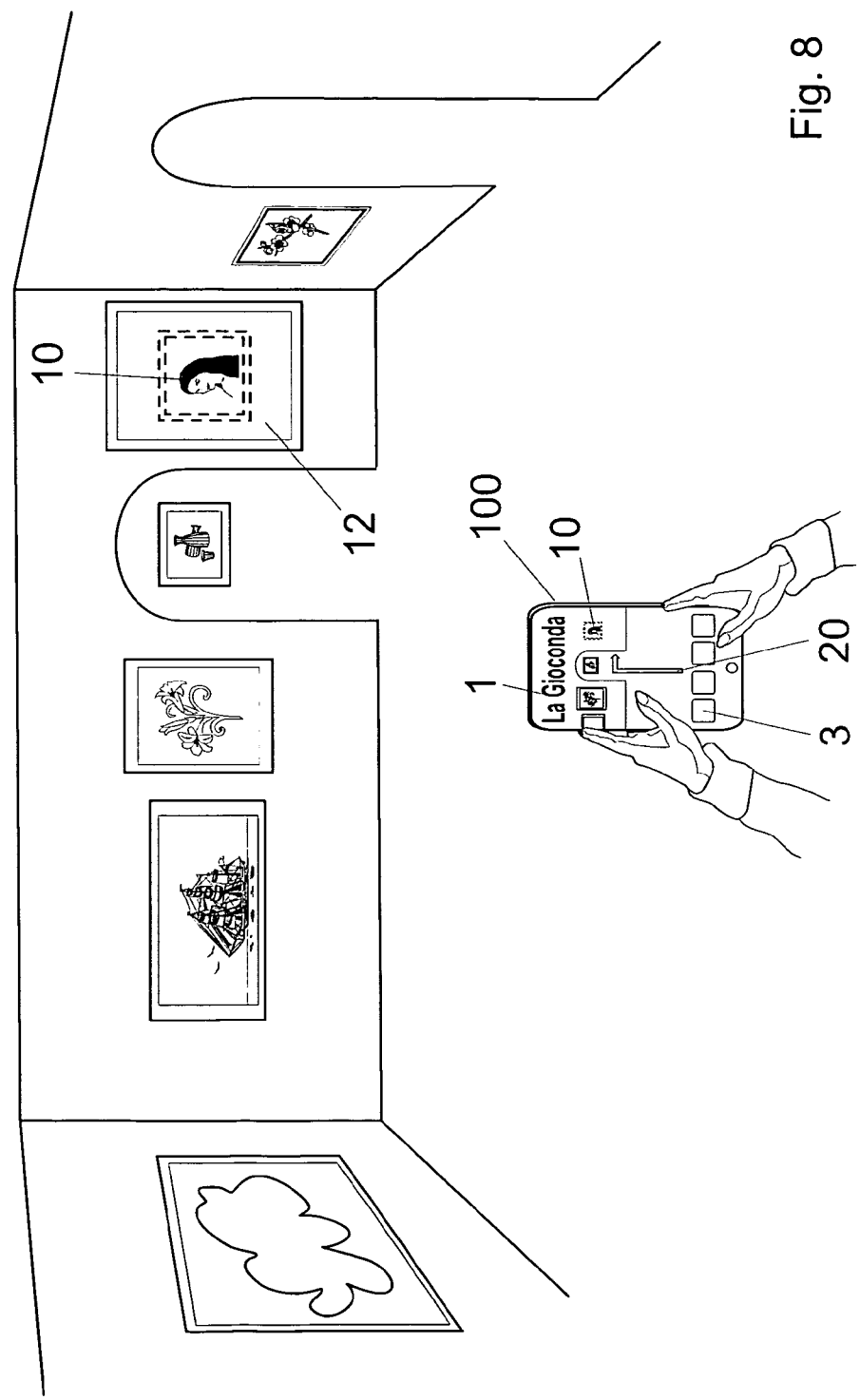
FIG. 8 shows a room of a museum and one embodiment of the device according to the invention.

FIG. 8 illustrates a room of a museum. In such a case the feature identification method according to the invention determines based on the retrieved conditions that the most interesting feature for annotation is a painting 10 which is in another room and is therefore not visible in the image captured by the camera of the portable device.

The painting 10 is illustrated with dashed lines, superposed on the view taken by the device 100 with another painting 12 in the current room. The portable device 100 can then annotate the capture image with an element, such as an arrow 20 indicating the direction to go to get to the painting 10. In one embodiment the painting 12 can be suppressed from the displayed image.

In one embodiment, the selected features can be clickable, so that, when they are clicked, additional information will be displayed.

In another embodiment the non selected features can also be clickable, so that, when they are clicked, an annotation will be displayed.

The portable device 100 can comprise haptic means 3 allowing the user to input information. The portable device comprises a display for displaying the image and its annotations.

The portable device can comprise one or more localisation sensors, e.g. GPS sensors and/or one or more network-based sensors, and/or one or more orientation sensors like gyroscopes and/or accelerometers.

According to one embodiment, if the annotation comprises a video, the user can interact with it, for example by pressing a pause and/or stop and/or rewind and/or forward and/or re-play buttons displayed on the portable device.

According to another embodiment, after the displaying of an annotation video or near a written annotation, one or more useful and clickable web links can appear, related to the annotated feature. For example if the annotated feature is a board or placard which advertises a specific car, for example a Ferrari, and the annotation is an advertising video, after the display of the video—or when the user stop it—on the portable device in correspondence or near the board a link to the Ferrari web site can appear. In one embodiment this link could propose to the user to buy the advertised product.

If the annotation is a video or audio file or stream, this file or stream is preferably time-synchronized with the video captured by the portable device. For example, if the user captures a video sequence from a train or from a car driving along a trajectory, which can be known or which can be retrieved from the captured image and/or from some locations sensors (e.g. a GPS sensor or a gyroscope), an annotating video can be superimposed over this captured video sequence, with elements of the superimposed video matching elements of the captured sequence. In another embodiment, the device can capture a video from a movie picture, for example displayed on TV, and superimpose on the captured sequence subtitles, audio comments, or another time-changing annotations time-synchronized with the video sequence.

According to another embodiment, if the portable device is rotated for example of 90°, the displayed annotations are adjusted in such a manner that they hold the same orientation with regard to the portable device user.

According to a further embodiment, if the weather conditions do not allow the identification of some features, e.g. some clouds cover the Cervin, the portable device automatically gives a negative feedback to the user, e.g. a message displayed on the portable device which informs the user that the identification is not possible, and asks the user to insert some input data for helping it to identify the features.

According to a further embodiment, the language of the written annotation and/or of the audio of the video-annotations can depend on the localisation sensor of the portable device or on some user settings, allowing for example a French tourist in Tokyo to display the annotations in French and not in Japanese.

According to further embodiment, the annotation method allows the user to interact with the augmented reality displayed on the portable device. For example if the user is in Rome taking an image or a video of the Coliseum, the annotation could be an image or a video of the reconstruction of the Coliseum as it was during the Roman age. According to a further embodiment, the annotation could comprise the possibility, for the user, to select the age corresponding to the annotation to display, e.g. the user can decide to display the reconstruction of Coliseum as it was during the Middle Ages or during the Renaissance or also the different phases of construction of this building.

According to another embodiment, if the annotation is a video and if there is more than one feature to annotate, the portable device can automatically select the most important feature to annotate according to some criteria, e.g. by taking into account the focusing distance or some user settings. According to another embodiment, all the features are simultaneously annotated but only one has the volume of the video sounds activated. The user can activate the volume of the video annotation of another feature by selecting it, e.g. by a click, and automatically the volume of the previous annotated feature is deactivated.

According to another embodiment, the annotation method comprises the definition of a plurality of confidence levels of the annotation as a "quality index", which can be related to
 the reliability and precision of the localisation; and/or
 the reliability of the identification of features
 the reliability of the image recognition process;
 etc.

At least one of those confidence levels can be used for detecting transitions when the device is moved by the user between a first position where one first feature to annotate is captured and recognised with a confidence level, and a second position or orientation where a second feature is recognised with high confidence. During the transition, the confidence level decreases, and this information can be used for interrupting the annotation.

According to an independent aspect of the invention, it is possible to automatically select feature identification data (i.e. model of features to recognize and annotate), as well as a related set of annotations candidates, i.e. a set of annotations among a plurality of annotations. The selection is based on at least one condition, similar to the automatic selection of a feature identification method among a plurality of feature identification methods. In one preferred embodiment, this at least one condition is retrieved from a location sensor, e.g. a GPS sensor, of the portable device.

Examples of conditions which can be used for selecting the feature identification data and associated annotations include:
 The geographical position of the camera retrieved from a location sensor, e.g. a GPS sensor linked to the camera image sensor, or from a cellular network such as a GSM or UMTS network. For example, a request to annotate an image captured in Paris will retrieve feature identification data and annotations corresponding to the Eifel Tower, but not features corresponding to the Matterhorn.
 User settings; and/or
 A datagram and/or bar-code and/or RFID and/or any other recognizable features, e.g. a logo, an OCR detection, on the feature(s) to annotate; and/or
 The current data and/or time; and/or The quality of the communication link between a server and the portable device; and/or The portable device computation power; and/or Etc.

The annotations candidates are then downloaded from a remote server on the portable device: in this manner the annotation of an image of a view can be done on the portable device without the need of any external server. A feature identification method, which in one embodiment can depend on the at least one condition as discussed above, is then applied for matching features of the captured image of the view with selected and downloaded reference features. After deciding which of the identified features are annotated, the correspondence between these identified features and the annotations candidates is verified.

If a correspondence or matching is found, the portable device then decides how and where to write and/or reproduce the annotations for the identified features, how many annotations insert on the image, the fonts' types and dimensions of the written-annotations, the volume or the language of the video-annotations, etc. Some of the identified features are then annotated.

If a correspondence or matching is not found, another set of feature identification data and annotation candidates is downloaded from the same or from another server and the correspondence between the identified features and the new candidates is verified.

The new set is preferably wider than the previous, i.e. it contains feature identification data and annotation candidates which have a lower number of common features. If a correspondence or matching is found, the above considerations are valid, if not the downloading and verifying steps are carried on in an iterative manner until when a correspondence or matching is found. If not, an annotation failure message is communicated to the portable device user, e.g. a written message is displayed on the portable device. In one embodiment the user is asked to help the device to find the annotations, e.g. by introducing some searching criteria on the portable device.

According to this independent aspect of the invention, a trade-off exists between the annotation method robustness and the number of feature identification data and annotations candidates to be downloaded on the portable device. In fact, if for example the condition for automatically selecting a set of annotations candidates among a plurality of annotations on a remote server is based on a GPS sensor, the less precise the GPS sensor, the higher the number of annotations candidates downloaded on the portable device.

According to a further aspect of the invention, feature identification data are selected in the server, and then downloaded from the remote server to the portable device, whereas the selection depends on the quality of the communication link between the server and the portable device. According to another aspect of the invention this selection depends on the portable device computation power and/or available memory space.

The annotations candidates and/or the feature identification data are downloaded on the portable device when it is turned on or when the displacement of the device is larger than a predetermined threshold, e.g. 1 meter. In another embodiment the portable device decides itself when the annotations candidates and/or the feature identification data have to be downloaded according to some criteria depending e.g. on its geographical location, the current time, etc.

According to a further independent aspect of the invention, feature identification and/or corresponding data can be added by a user on his mobile device, and then sent from the portable device to a remote server. For example, a user can take an image or video of a scene, indicate one feture of the image or images to identify in order to build a model resulting in feature identification data, and associate an annotation, such as text, formatted text, image, hyperlink, audio, video, etc, to this feature. The feature identification data and associated annotation entered by the user is then automatically or on user's request stored in a remote server, and made available to this user and to other users for subsequent use. This allows to share those feature identification data and corresponding annotations, so that other users's portable devices will be able to recognize and annotate those new features. Subsequent requests to the remote server will then retrieve the new feature identification data and corresponding annotation, depending on the above mentioned condition.

The invention claimed is:

1. A computerized method for annotating at least one feature of an image of a view, comprising:
   capturing the image with an image sensor of a portable device;
   selecting, with a processor of the portable device, a feature identification method from a plurality of available feature identification methods based on a focusing distance, wherein the focusing distance indicates a foreground focus or a background focus on an object in the image, and wherein said plurality of feature identification methods comprises:
      a first feature identification method matching features of said image with one or more of a plurality of 2D reference images that is selected when said focusing distance indicates background focus on the object in the image,
      a second feature identification method matching features of said image with projections of one or more of a plurality of 3D models that is selected when said focusing distance indicates foreground focus on the object in the image, or
      a combination thereof;
   applying, with the processor of the portable device, said feature identification method for identifying a plurality of features of said image, and deciding which of said identified features of said image are to be annotated;
   annotating, with the processor of the portable device, at least some of the identified features, resulting in an annotated image with superimposed annotations; and
   displaying the annotated image with the superimposed annotations on a display of the portable device.

2. The method of claim 1, wherein the selection of the feature identification method depends on a result of an image analysis of said image.

3. The method of claim 1, further comprising
   selecting the feature identification method based at least in part on a device parameter, wherein the device parameter comprises a geographical location of said portable device.

4. The method of claim 1, further comprising selecting the feature identification method based at least in part on a device parameter, wherein the device parameter comprises at least one setting parameter of a lens of said image sensor.

5. The method of claim 1, further comprising validating said selected feature identification method based on input from a user.

6. The method of claim 1, further comprising replacing the selected feature identification method with another feature identification method based on a manual selection.

7. The method of claim 1, comprising
based on said focusing distance, or a device parameter to capture said image, automatically selecting feature identification data and a set of corresponding annotations candidates on a remote server,
downloading said feature identification data and said set of corresponding annotation candidates on said portable device,
selecting a feature identification method to apply,
verifying existence of at least one correspondence between said selected and downloaded feature identification data and identified features of said image,
if a correspondence is found, annotating at least some of the identified features,
if a correspondence is not found, changing and/or widening the set of annotations candidates until a correspondence is found.

8. The method of claim 1, further comprising
based on said focusing distance, or a device parameter to capture said image, and/or the quality of a communication link between a remote server and said portable device and/or computation power of said portable device, automatically selecting a set of feature identification data on a remote server,
downloading said selected set of feature identification data on said portable device,
annotating at least some of the identified features by using said selected and downloaded feature identification data.

9. The method of claim 1, wherein:
features identification data and corresponding annotations are added with said portable device;
those added features identification data and corresponding annotations are sent to a remote server and made available to other portable devices for annotating corresponding features when identified in an image.

10. A computer-readable non-transitory storage medium encoded with instructions for causing a programmable processor to perform a method, comprising:
capturing an image with an image sensor of a portable device;
selecting a feature identification method from a plurality of available feature identification methods based on a focusing distance, wherein the focusing distance indicates a foreground focus or a background focus on an object in the image, and wherein said plurality of feature identification methods comprises:
a first feature identification method matching features of said image with one or more of a plurality of 2D reference images that is selected when said focusing distance indicates background focus on the object in the image,
a second feature identification method matching features of said image with projections of one or more of a plurality of 3D models that is selected when said focusing distance indicates foreground focus on the object in the image, or
a combination thereof;
applying the selected feature identification method for identifying a plurality of features of said image, and deciding which of said identified features of said image are to be annotated;
annotating at least some of the identified features, resulting in an annotated image with superimposed annotations; and
displaying the annotated image with the superimposed annotation on a display of the portable device.

* * * * *